US008914832B2

(12) United States Patent
Yamagishi

(10) Patent No.: US 8,914,832 B2
(45) Date of Patent: Dec. 16, 2014

(54) INFORMATION PROCESSING APPARATUS, INFORMATION PROCESSING METHOD, AND PROGRAM

(71) Applicant: Sony Corporation, Tokyo (JP)

(72) Inventor: Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/934,473

(22) Filed: Jul. 3, 2013

(65) Prior Publication Data

US 2014/0173661 A1 Jun. 19, 2014

Related U.S. Application Data

(60) Provisional application No. 61/737,469, filed on Dec. 14, 2012.

(51) Int. Cl.

| | |
|---|---|
| ***G06F 3/00*** | (2006.01) |
| ***G06F 13/00*** | (2006.01) |
| ***H04N 5/445*** | (2011.01) |
| ***H04N 7/18*** | (2006.01) |
| ***H04N 21/431*** | (2011.01) |

(52) U.S. Cl.

CPC .................................. *H04N 21/431* (2013.01)

USPC ............................................... 725/74; 725/43

(58) Field of Classification Search

USPC ........... 725/37, 43, 47, 74, 82, 100, 131, 132, 725/133, 134; 348/564, 565

See application file for complete search history.

(56) References Cited

U.S. PATENT DOCUMENTS

| | | | | |
|---|---|---|---|---|
| 7,987,491 | B2 * | 7/2011 | Reisman | 725/112 |
| 2002/0162120 | A1 * | 10/2002 | Mitchell | 725/135 |
| 2008/0307458 | A1 * | 12/2008 | Kim et al. | 725/38 |
| 2010/0299597 | A1 * | 11/2010 | Shin et al. | 715/702 |
| 2011/0075990 | A1 | 3/2011 | Eyer | |
| 2011/0088075 | A1 | 4/2011 | Eyer | |
| 2011/0243536 | A1 | 10/2011 | Eyer | |
| 2011/0246488 | A1 | 10/2011 | Eyer | |

(Continued)

FOREIGN PATENT DOCUMENTS

| | | |
|---|---|---|
| JP | 2003-299051 A | 10/2003 |
| JP | 2006-050237 | 2/2006 |
| JP | 2008-191929 A | 8/2008 |
| JP | 2012-168801 | 9/2012 |

OTHER PUBLICATIONS

International Search Report issued Dec. 24, 2013, in PCT/JP2013/0082131, filed Nov. 29, 2013 with English translation.
U.S. Appl. No. 13/559,188, filed Jul. 26, 2012, Kitazato.

(Continued)

*Primary Examiner* — John Schnurr
(74) *Attorney, Agent, or Firm* — Oblon, Spivak, McClelland, Maier & Neustadt, L.L.P.

(57) ABSTRACT

Disclosed herein is an information processing apparatus which cooperates with a terminal apparatus to configure a home network system, including: a frame visual attribute setting section configured to set a frame visual attribute to a window provided on a screen to display a reproduced piece of content; a publication section configured to publish a command adapted to request notification of the frame visual attribute set to the window from the terminal apparatus to the terminal apparatus; and a notification section configured to notify the terminal apparatus of the frame visual attribute of the window in response to calling of the command from the terminal apparatus.

19 Claims, 11 Drawing Sheets

(56) References Cited

U.S. PATENT DOCUMENTS

| | | | | |
|---|---|---|---|---|
| 2011/0247028 | A1 | 10/2011 | Eyer | |
| 2011/0298981 | A1 | 12/2011 | Eyer | |
| 2011/0299827 | A1 | 12/2011 | Eyer | |
| 2011/0302599 | A1 | 12/2011 | Eyer | |
| 2011/0302611 | A1 | 12/2011 | Eyer | |
| 2011/0307920 | A1 | 12/2011 | Blanchard et al. | |
| 2012/0044418 | A1 | 2/2012 | Eyer | |
| 2012/0047531 | A1 | 2/2012 | Eyer | |
| 2012/0050619 | A1 | 3/2012 | Kitazato et al. | |
| 2012/0050620 | A1 | 3/2012 | Kitazato | |
| 2012/0054214 | A1 | 3/2012 | Yamagishi et al. | |
| 2012/0054235 | A1 | 3/2012 | Kitazato et al. | |
| 2012/0054267 | A1 | 3/2012 | Yamagishi et al. | |
| 2012/0054268 | A1 | 3/2012 | Yamagishi | |
| 2012/0054783 | A1 | 3/2012 | Yamagishi | |
| 2012/0054784 | A1 | 3/2012 | Kitazato et al. | |
| 2012/0054816 | A1 | 3/2012 | Dewa | |
| 2012/0060197 | A1 | 3/2012 | Kitahara et al. | |
| 2012/0063508 | A1 | 3/2012 | Hattori et al. | |
| 2012/0072965 | A1 | 3/2012 | Dewa | |
| 2012/0081508 | A1 | 4/2012 | Kitazato | |
| 2012/0081607 | A1 | 4/2012 | Kitazato | |
| 2012/0082266 | A1 | 4/2012 | Kitazato et al. | |
| 2012/0082440 | A1 | 4/2012 | Kitazato | |
| 2012/0084802 | A1 | 4/2012 | Kitazato | |
| 2012/0084824 | A1 | 4/2012 | Kitazato | |
| 2012/0084829 | A1* | 4/2012 | Kitazato | 725/110 |
| 2012/0185888 | A1 | 7/2012 | Eyer et al. | |
| 2012/0253826 | A1 | 10/2012 | Kitazato et al. | |
| 2012/0274848 | A1 | 11/2012 | Kitahara et al. | |
| 2012/0275764 | A1 | 11/2012 | Eyer | |
| 2013/0024894 | A1 | 1/2013 | Eyer | |
| 2013/0024897 | A1 | 1/2013 | Eyer | |
| 2013/0031569 | A1 | 1/2013 | Kitazato et al. | |
| 2013/0036440 | A1 | 2/2013 | Eyer | |
| 2013/0055313 | A1 | 2/2013 | Eyer | |
| 2013/0103716 | A1 | 4/2013 | Yamagishi | |
| 2013/0145414 | A1 | 6/2013 | Yamagishi | |

OTHER PUBLICATIONS

U.S. Appl. No. 13/587,975, filed Aug. 17, 2012, Kitazato.
U.S. Appl. No. 13/593,554, filed Aug. 24, 2012, Kitazato et al.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.

* cited by examiner

| ACR QUERY IDENTIFIER | SIGNATURE TYPE IDENTIFIER | SERVICE IDENTIFIER | CONTENT IDENTIFIER | REPRODUCTION TIME | LOCAL TIMESTAMP | RELATED METADATA (LINKED APPLICATION IDENTIFIER) | SOURCE ADDRESS | SIGNATURE |
|---|---|---|---|---|---|---|---|---|
| 121 | 122 | 123 | 124 | 125 | 126 | 127 | 128 | 129 |

← 120

| ACR QUERY IDENTIFIER | SERVICE IDENTIFIER | IDENTIFICATION FAILURE FLAG | SOURCE ADDRESS | SIGNATURE |
|---|---|---|---|---|
| 121 | 122 | 130 | 128 | 129 |

← 120

INFORMATION PROCESSING APPARATUS, INFORMATION PROCESSING METHOD, AND PROGRAM

CROSS-REFERENCE TO RELATED APPLICATION

This application claims the benefit of priority of Provisional Application Ser. No. 61/737,469, filed Dec. 14, 2012, the entire contents of which is incorporated herein by reference.

BACKGROUND

The present disclosure relates to an information processing apparatus, an information processing method, and a program, and particularly to an information processing apparatus, an information processing method, and a program suitable for use in a case where content displayed on a certain screen device which configures a home network is identified by an ACR (Automatic Content Recognition) service and metadata corresponding to the content is displayed on a different screen device or an application is executed in accordance with the progression of the content.

For example, it is supposed to display, to a viewer of a TV (television) program, information (performers, a plot outline, a trailer and so forth) relating to the TV broadcast, information useful to a viewer (news, weather forecast, traffic information and so forth) although it does not have a direct relationship to the program, and so forth on the screen.

In order to implement this, a command used to acquire and start up an application program for exclusive use (hereinafter referred to simply as application) may be transmitted to a TV receiver or the like in a linked relationship with the progression of the program. Actually, in Japan, Europe and so forth, this has been implemented by transmitting the command or the application making use of a frequency band for data broadcasting in a TV broadcasting signal (refer to, for example, Japanese Patent Laid-Open No. 2006-50237).

In the meantime, in the United States, a frequency band for data broadcasting is not provided in a TV broadcasting signal, and a replacing method is not established. Therefore, it has not been implemented to execute an application in a linked relationship with the progression of a program.

It is to be noted that, in the United States, the number of households in which a program is viewed through a CATV, an IPTV or the like is greater than the number of households in which a TV broadcasting wave is received directly by and viewed on a TV receiver. Since the CATV or the IPTV sometimes extracts only video and audio signals of a program from a TV broadcasting signal and distributes the video and audio signals, even if a frequency band for data broadcasting is provided in a TV broadcasting signal in the United states, there is no guarantee that a data broadcasting signal including an application and related data is transmitted to a reception apparatus.

Further, it is requested recently to execute, even in a case in which not only a program being broadcast but also a program recorded, videos reproduced from a package medium such as a DVD or a BD, moving pictures, music or the like downloaded through the Internet (such programs and so forth mentioned are hereinafter referred to as content) are being viewed, an application in a linked relationship with the progression of the content.

In order to implement this request, it is necessary to identify the piece of content being viewed, and as one method therefor, a technique called ACR (Automatic Content Recognition) service is available (refer, for example, to Japanese Patent Laid-Open No. 2012-168801).

The ACR service is implemented by an ACR client and an ACR server. The ACR client, which is incorporated in a content reproduction apparatus such as a TV receiver, extracts, from content being viewed, signature data representative of a characteristic of the content and notifies the ACR server to request identification of the content. The ACR server compares the received signature data with signature data of content recorded in a database in advance to identify the content being viewed on the content reproduction apparatus. Further, the ACR server issues an ACR response including metadata relating to the identified content and information indicative of an application to be executed in a linked relationship (such application is hereinafter referred to as linked application) to the ACR client.

The content reproduction apparatus in which the ACR client which receives the response is incorporated acquires a linked application from a predetermined server and executes the linked application.

SUMMARY

Incidentally, in the United States, as a result of popularization of a CATV, an IPTV and so forth, a TV receiver is positioned as a displaying outputting device of an external apparatus such as a set top box of a CATV, an IPTV or the like as described above.

Therefore, a user has few opportunities to operate a remote controller of a TV receiver but frequently operates a remote controller of the external apparatus. Therefore, there is the possibility that an operation for a linked application started up in a TV receiver as a content reproduction apparatus which is operated by a remote controller of the TV receiver may not be favorable in convenience in use to the user.

Accordingly, taking the convenience to a user into consideration, a request to cause a second screen device, which is different from a content reproduction apparatus (TV receiver or the like) in which an ACR client is incorporated, to display metadata relating to content being viewed on the content reproduction apparatus or to execute a linked application has been and is being generated.

Here, as the second screen device, for example, a tablet type terminal, a slate PC, a smartphone and so forth can be listed.

Further, in recent years, a second screen device of the type which can operate the external apparatus with a predetermined application program started up in the second screen device, namely, of the type which can be utilized as a remote controller for the external apparatus, is available. Therefore, implementation of the request described above is desired also from a point of view that operation inputting devices for a content reproduction apparatus and an external apparatus are consolidated on the second screen device.

Furthermore, mainly in the United States, there is a tendency that the screen size of a TV receiver and so forth as a content reproduction apparatus becomes greater than 50 to 60 inches, and a utilization form in which a plurality of pieces of content different from each other are displayed and viewed simultaneously on the screen of the increased size begins to be gradually popularized. Accordingly, also it is necessary to consider also a utilization form in which an ACR client is built in a TV receiver or the like which has such a large-sized screen and is linked with a second screen device. In the following description, a TV receiver or the like which has a large-sized screen and can display a plurality of different pieces of content at the same time is referred to as a multi-window screen device.

FIG. 1 is a schematic view of a space in a case where it is assumed to link a multi-window screen device in which an ACR client is built and a second (2nd) screen device with each other to utilize an ACR service and the devices are disposed in a home of a user or the like.

In FIG. 1, a multi-window screen device 1-1 is installed on the front of the user, and a multi-window screen device 1-2 is installed on a left side wall. A second screen device 3 is disposed in the proximity of the user.

A plurality of (in the case of FIG. 1, three) windows can be provided on the multi-window screen device 1-1, and different pieces of content (which may be the same as each other) can be displayed at the same time in the windows. In the following description, for example, the piece of content displayed in a window A is referred to as content A. This similarly applies also to the other pieces of content displayed in the other windows.

The multi-window screen device 1-1 can transfer an ACR response, which includes an identification result and so forth of the pieces of content displayed in the windows, to the second screen device 3 by utilizing an ACR service.

Also the multi-window screen device 1-2 is similar to the multi-window screen device 1-1. However, in FIG. 1, the multi-window screen device 1-2 is in a state in which only a window X is provided on the screen thereof and a content X is displayed in the window X.

The second screen device 3 can simultaneously display metadata corresponding to the pieces of content displayed in the windows of the multi-window screen device 1-1 or the multi-window screen device 1-2 and a started-up linked application in accordance with the progression of the content.

In the case of FIG. 1, the second screen device 3 is in a state in which a linked application A to the content A of the window A, another linked application C to the content C of the window C and metadata X of the content X of the window X are displayed simultaneously.

In the case where the utilization form illustrated in FIG. 1 is assumed, there is the possibility that the user may not be able to rapidly grasp a corresponding relationship of the pieces of information (videos of the linked applications and metadata) displayed on the screen of the second screen device 3 to the pieces of content displayed in the windows of the multi-window screen devices 1-1 and 1-2.

Accordingly, a contrivance allowing a user to rapidly grasp a corresponding relationship between a plurality of pieces of content which can be displayed simultaneously in the windows of the multi-window screen devices 1-1 and 1-2 and a plurality of pieces of information (videos of linked applications and metadata) which can be displayed on the second screen device 3 is required.

The present disclosure has been made in view of such a situation as described above and makes it possible for a user to rapidly grasp a corresponding relationship between a plurality of pieces of content which can be displayed simultaneously and information which is displayed separately.

According to a first mode of the present disclosure, there is provided an information processing apparatus which cooperates with a terminal apparatus to configure a home network system, including: a frame visual attribute setting section configured to set a frame visual attribute to a window provided on a screen to display a reproduced piece of content; a publication section configured to publish a command adapted to request notification of the frame visual attribute set to the window from the terminal apparatus to the terminal apparatus; and a notification section configured to notify the terminal apparatus of the frame visual attribute of the window in response to calling of the command from the terminal apparatus.

The display control section may set, to a plurality of windows provided on the screen to display a plurality of different pieces of content therein, different frame visual attributes, and the publication section may publish a command adapted to request notification of the frame visual attributes of the plurality of windows from the terminal apparatus to the terminal apparatus.

The frame visual attribute setting section may change the frame visual attributes of the windows in response to a request issued from the terminal apparatus utilizing the command.

The publication section may describe a URL of the command directly in the device description described expanding a prescription of UPnP to publish the URL of the command to the terminal apparatus.

The command may be WebAPI.

The publication section may multicast distribute a Notify message on the home network and publish the device description to the terminal apparatus in response to an access from the terminal apparatus based on the Notify message.

The publication section may publish the device description to the terminal apparatus in response to M-Search from the terminal apparatus.

According to the first mode of the present disclosure, the information processing apparatus may further include an identification request processing section configured to extract, from a reproduced piece of content, signature data representative of a characteristic of the piece of content, generate and transmit a query including at least the extracted signature data to an identification server and receive a response transmitted thereto from the identification server in response to the query and representative of a result of the identification of the reproduced piece of content, and the publication section may publish also a command adapted to render the identification request processing section operative from the terminal apparatus to the terminal apparatus.

According to the first mode of the present disclosure, there is provided an information processing method for an information processing apparatus which cooperates with a terminal apparatus to configure a home network system, the method executed by the information processing apparatus, including: a frame visual attribute setting step of setting a frame visual attribute to a window provided on a screen to display a reproduced piece of content; a publication step of publishing a command adapted to request notification of the frame visual attribute set to the window from the terminal apparatus to the terminal apparatus; and a notification step of notifying the terminal apparatus of the frame visual attribute of the window in response to calling of the command from the terminal apparatus.

According to the first mode of the present disclosure, there is provided a program used to cause a computer, which cooperates with a terminal apparatus to configure a home network system, to function as: a frame visual attribute setting section configured to set a frame visual attribute to a window provided on a screen to display a reproduced piece of content; a publication section configured to publish a command adapted to request notification of the frame visual attribute set to the window from the terminal apparatus to the terminal apparatus; and a notification section configured to notify the terminal apparatus of the frame visual attribute of the window in response to calling of the command from the terminal apparatus.

In the first mode of the present disclosure, a frame visual attribute is set to a window provided on a screen to display a reproduced piece of content, and a command adapted to request notification of the frame visual attribute set to the window from the terminal apparatus is published to the terminal apparatus. Further, the terminal apparatus is notified of the frame visual attribute of the window in response to calling of the command from the terminal apparatus.

According to a second mode of the present disclosure, there is provided an information processing apparatus which cooperates with a content displaying apparatus, displaying a piece of content in a window provided on a screen, to configure a home network system, including: a command acquisition section configured to acquire a command adapted to request notification of a frame visual attribute set to the window provided on the screen of the content displaying apparatus to display a reproduced piece of content from the content displaying apparatus and call the command to receive notification of the frame visual attribute; a linked application execution section configured to acquire and execute a linked application to be executed in accordance with the progression of the piece of content displayed in the window provided on the screen of the content displaying apparatus; and a frame displaying controlling section configured to set a frame visual attribute same as the notified frame visual attribute to a frame in which an image by the linked application is to be displayed.

The command acquisition section may acquire a URL of the command described directly in a device description published by the content displaying apparatus and described expanding a prescription of UPnP.

The command may be WebAPI.

The command acquisition section may acquire the device description from the content displaying apparatus based on a Notify message multicast distributed on the home network by the content displaying apparatus.

The command acquisition section may acquire the device description supplied thereto from the content displaying apparatus searched out by M-Search.

The content displaying apparatus may include an identification request processing section configured to extract, from a reproduced piece of content, signature data representative of a characteristic of the piece of content, generate and transmit a query including at least the extracted signature data to an identification server and receive a response transmitted back from the identification server in response to the query and representative of a result of the identification of the reproduced piece of content. The command acquisition section may acquire also a command adapted to render the identification request processing section of the content displaying apparatus operative from the content displaying apparatus and receives the response transferred thereto from the content displaying apparatus by calling the command, and the linked application execution section may acquire and execute the linked application based on related metadata included in the received response and corresponding to the identified piece of content.

According to the second mode of the present disclosure, there is provided an information processing method for an information processing apparatus which cooperates with a content displaying apparatus, displaying a piece of content in a window provided on a screen, to configure a home network system, the method executed by the information processing apparatus, including: an acquisition step of acquiring a command adapted to request notification of a frame visual attribute set to the window provided on the screen of the content displaying apparatus to display a reproduced piece of content from the content displaying apparatus; a reception step of calling the command to receive the notification of the frame visual attribute; a linked application execution step of acquiring and executing a linked application to be executed in accordance with the progression of the piece of content displayed in the window provided on the screen of the content displaying apparatus; and a frame displaying controlling step of setting a frame visual attribute same as the notified frame visual attribute to a frame in which an image by the linked application is to be displayed.

According to the second mode of the present disclosure, there is provided a program used to cause a computer, which cooperates with a content displaying apparatus, displaying a piece of content in a window provided on a screen, to configure a home network system, to function as: a command acquisition section configured to acquire a command adapted to request notification of a frame visual attribute set to the window provided on the screen of the content displaying apparatus to display a reproduced piece of content from the content displaying apparatus and call the command to receive notification of the frame visual attribute; a linked application execution section configured to acquire and execute a linked application to be executed in accordance with the progression of the piece of content displayed in the window provided on the screen of the content displaying apparatus; and a frame displaying controlling section configured to set a frame visual attribute same as the notified frame visual attribute to a frame in which an image by the linked application is to be displayed.

In the second mode of the present disclosure, a command adapted to request notification of a frame visual attribute set to the window provided on the screen of the content displaying apparatus to display a reproduced piece of content is acquired from the content displaying apparatus, and the command is called to receive notification of the frame visual attribute. A linked application to be executed in accordance with the progression of the piece of content displayed in the window provided on the screen of the content displaying apparatus is acquired and executed, and a frame visual attribute same as the notified frame visual attribute is set to a frame in which an image by the linked application is to be displayed.

According to a third mode of the present disclosure, there is provided an information processing method for a home network system which includes a content displaying apparatus and a terminal apparatus, including: a frame visual attribute setting step by the content displaying apparatus of setting a frame visual attribute to a window provided on a screen to display a reproduced piece of content; a publication step by the content displaying apparatus of publishing a command adapted to request notification of the frame visual attribute set to the window from the terminal apparatus to the terminal apparatus; an acquisition step by the terminal apparatus of acquiring the published command; a notification step by the content displaying apparatus of notifying the terminal apparatus of the frame visual attribute of the window in response to calling of, the command by the terminal apparatus; a linked application execution step by the terminal apparatus of acquiring and executing a linked application to be executed in accordance with the progression of the piece of content displayed in the window provided on the screen of the content displaying apparatus; and a frame displaying controlling step by the terminal apparatus of setting a frame visual attribute same as the notified frame visual attribute to a frame in which an image by the linked application is to be displayed.

In the third mode of the present disclosure, by the content displaying apparatus, a frame visual attribute is set to a window provided on a screen to display a reproduced piece of content, and a command adapted to request notification of the frame visual attribute set to the window from the terminal apparatus is published to the terminal apparatus. Meanwhile, by the terminal apparatus, the published command is acquired. Further, by the content displaying apparatus, the terminal apparatus is notified of the frame visual attribute of the window in response to calling of the command by the terminal apparatus. Then, by the terminal apparatus, a linked application to be executed in accordance with the progression of the piece of content displayed in the window provided on the screen of the content displaying apparatus is acquired and executed. Thereupon, a frame visual attribute same as the notified frame visual attribute is set to a frame in which an image by the linked application is to be displayed.

With the first mode of the present disclosure, the terminal apparatus can be notified of a frame visual attribute set to a window displaying a piece of content.

With the second mode of the present disclosure, a frame visual attribute same as the frame visual attribute set to the window displaying a piece of content on the content displaying apparatus can be set to a frame adapted to display an image by a linked application to be executed in accordance with the progression of the piece of content.

With the third mode of the present disclosure, a common frame visual attribute can be set to both of a window displaying a piece of content on the content displaying apparatus and a frame adapted to display an image by a linked application to be executed in accordance with the progression of the piece of content by the terminal apparatus.

DETAILED DESCRIPTION OF THE PREFERRED EMBODIMENT

In the following, a best mode for carrying out the present disclosure (hereinafter referred to as embodiment) is described in detail with reference to the drawings.

[Outline of ACR Serve Utilization System]

Figure 1:
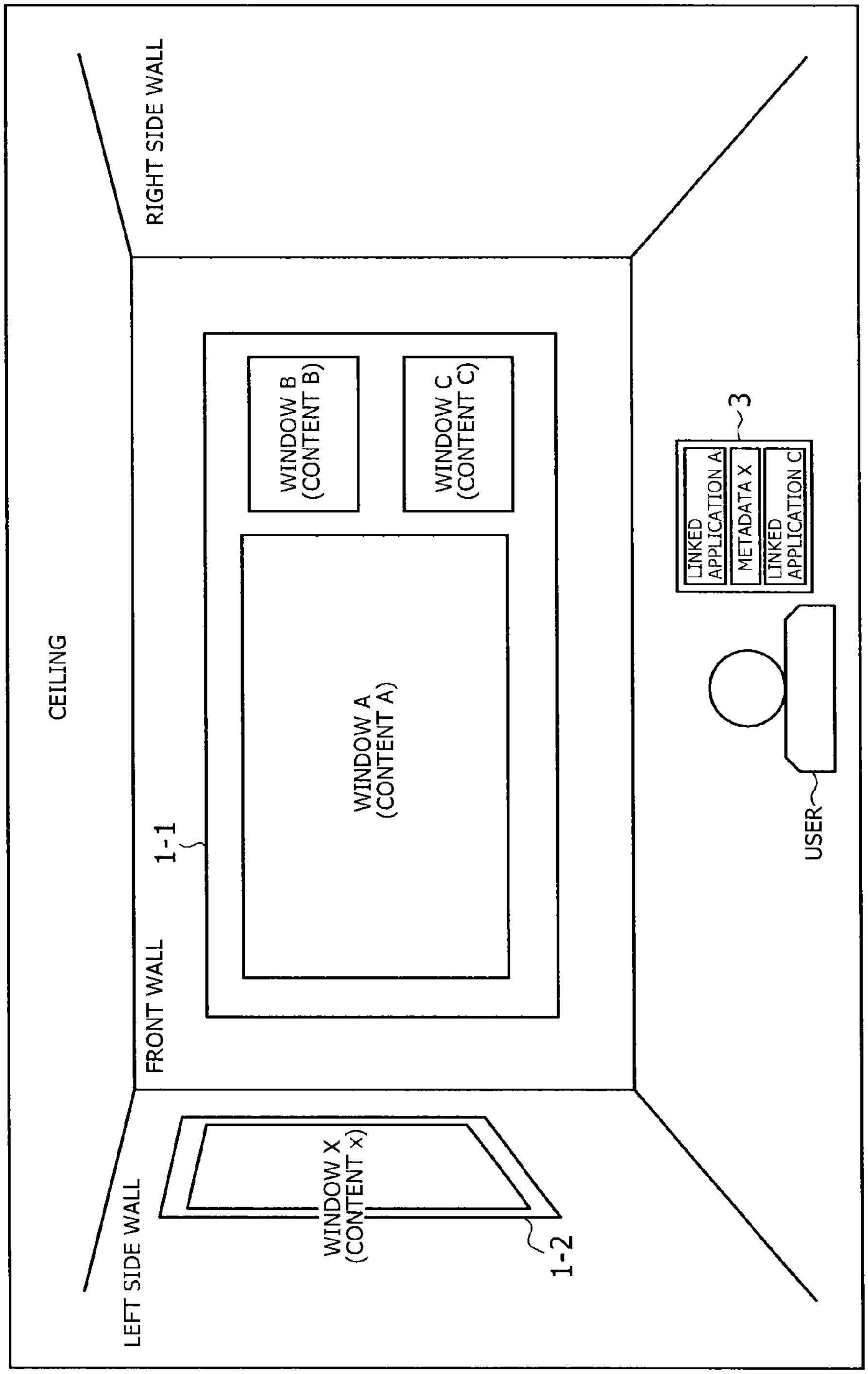
FIG. 1 is a schematic view of a space in the case where a multi-window screen device and a second screen device are linked with each other and an ACR service is utilized.
Figure 2:
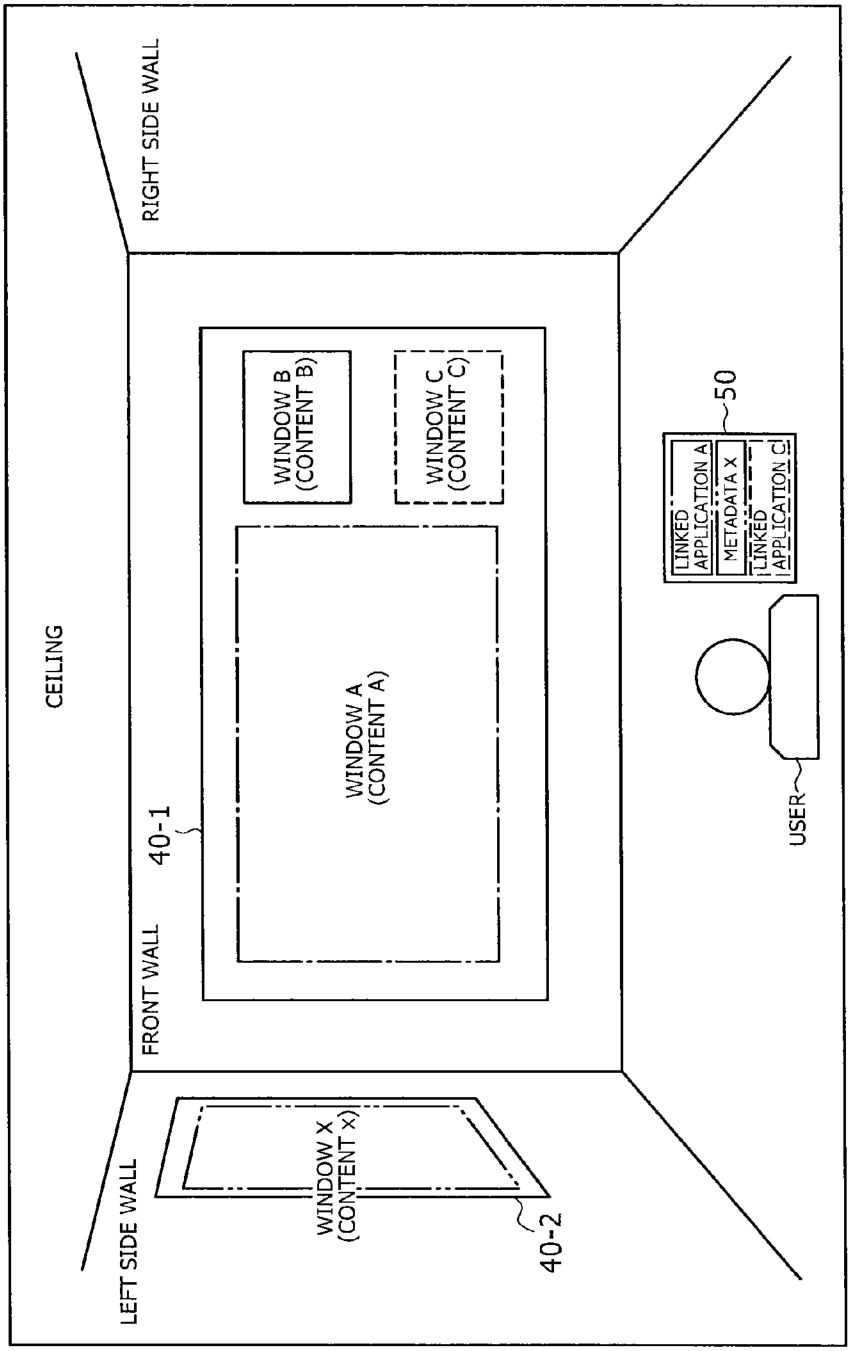
FIG. 2 is a schematic view of a space illustrating an outline of the present disclosure.

FIG. 2 shows an outline of an ACR service utilization system which is an embodiment of the present disclosure. The ACR service utilization system includes multi-window screen devices 40-1 and 40-2 and a second screen device 50 which have a built-in ACR client and causes the devices to link with each other to utilize an ACR service.

In FIG. 2, the multi-window screen device 40-1 is installed on the front of a user, and the multi screen device 40-2 is installed on a left side wall. In the proximity of the user, the second screen device 50 is disposed.

A plurality of (in the case of FIG. 2, three) windows can be provided on a screen of the multi-window screen device 40-1, and pieces of content different from each other (which may be the same as each other) can be displayed in the windows simultaneously. In the following description, for example, the piece of content displayed in a window A is referred to as content A. This similarly applies also to the other pieces of content displayed in the other windows.

Further, the multi-window screen device 40-1 can transfer an ACR response, which includes an identification result and so forth of the pieces of content displayed in the windows, to the second screen device 50 by utilizing the ACR service.

Furthermore, the multi-window screen device 40-1 can provide, to a frame of each window, an attribute (hereinafter referred to as frame visual attribute) which can be visually distinguished from frames of the other windows (including the window of the multi-window screen device 40-2).

As the frame visual attribute, a color, a thickness and a type of a frame line, a depth of three-dimensional display and so forth which can be set and changed by the CSS (Cascading Style Sheets) can be listed. In the case of FIG. 2, the frame line of each window is set different from those of the frames of the other windows, and the frame line of the window A is set to an alternate long and short dash line; the frame line of the window B is set to a solid line; and the frame line of the window C is set to a broken line.

The multi-window screen device 40-2 is similar to the multi-window screen device 40-1. However, in FIG. 2, the multi-window screen device 40-2 is in a state in which only a window X is provided on the screen thereof and the frame line of the window W is set to an alternate long and two short dashes line to display content X.

In the second screen device 50, metadata corresponding to the pieces of content displayed in the windows of the multi-window screen devices 40-1 and 40-2 and a linked application conforming to the progression of the content can be started up and displayed.

Further, in the second screen device 50, it is possible to provide a frame to each piece of information to be displayed (a screen image of metadata or a linked application corresponding to the content) and set, to the frame, a frame visual attribute similar to that of the frame of the window in which the corresponding content is displayed.

In particular, in the case of FIG. 2, the second screen device 50 is in a state in which the linked application A corresponding to the content A of the window A is displayed in the frame of an alternate long and short dash line; the linked application C corresponding to the content C of the window C is displayed in the frame of a broken line; and metadata X corresponding to the content X of the window X is displayed in the frame of an alternate long and two short dashes line, simultaneously. It is to be noted that, also in a case in which such pieces of information are not displayed simultaneously but are displayed switchably, a frame visual attribute similar to that of the frame of the window in which the corresponding content is displayed can be set to the frame.

[Example of Configuration of ACR Service Utilization System]

Figure 3:
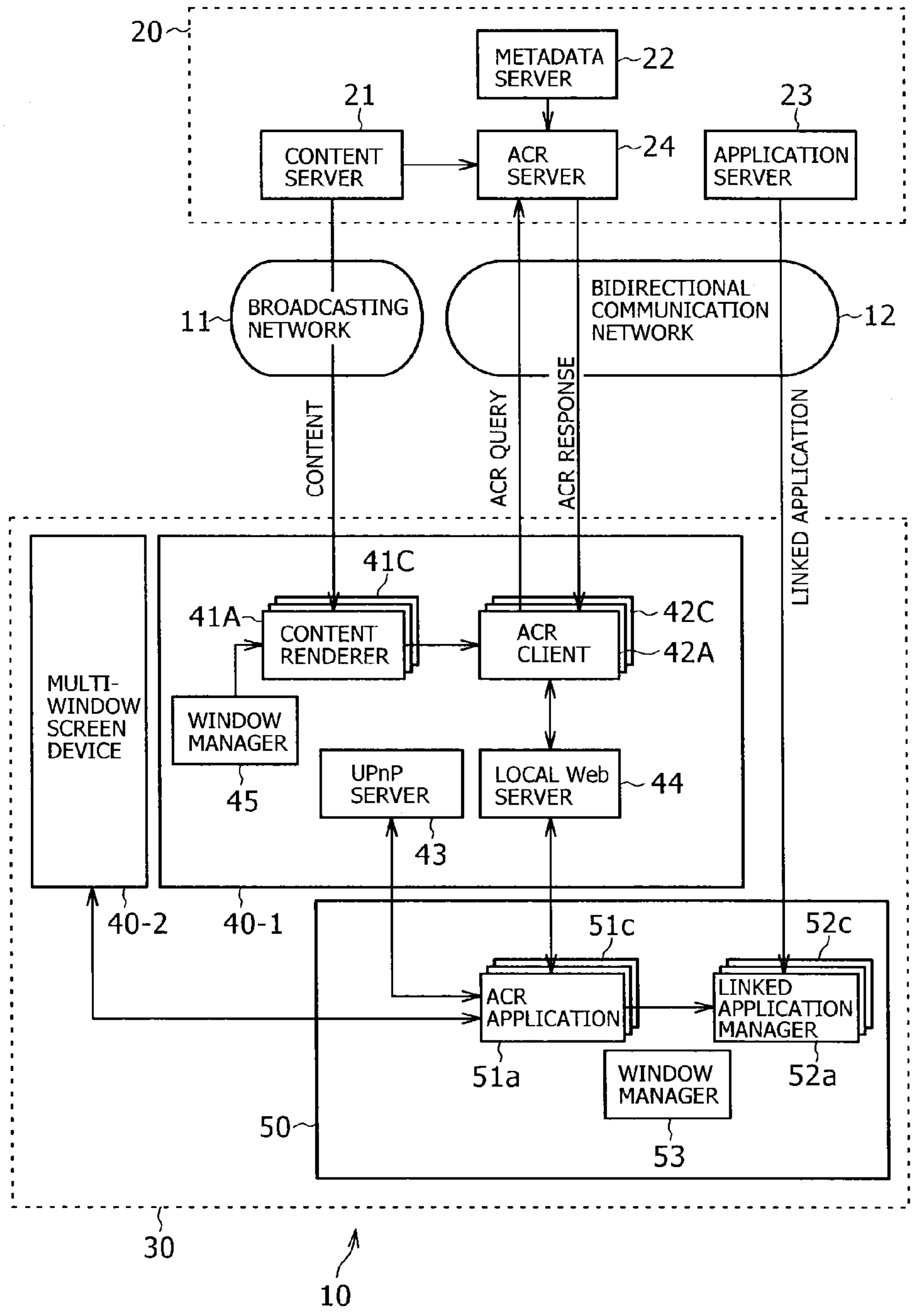
FIG. 3 is a block diagram showing an example of a configuration of an ACR service utilization system which is an embodiment of the present disclosure.

FIG. 3 shows an example of a configuration of the ACR service utilization system of the embodiment of the present disclosure.

This ACR service utilization system 10 identifies more than one piece of content displayed simultaneously on the screens of the multi-window screen devices 40-1 and 40-2 such as a TV receiver having a large-sized screen and presents metadata relating to the pieces of content to the user through the second screen device 50 or executes a linked application in conformity with the progression of the content. In the following description, in the case where there is no necessity to individually distinguish the multi-window screen devices 40-1 and 40-2 from each other, each of them is referred to merely as multi-window screen device 40.

Here, a piece of content is not limited to a program being broadcast. In particular, all AV content such as, for example, a program recorded and reproduced by an external apparatus such as a video recorder connected to the multi-window screen device 40, a video of a cinema or the like reproduced from a package medium, and a moving picture and music downloaded through the Internet or the like are included in the content. Also a commercial message (hereinafter referred to as CM) inserted between programs or midway of a program is included in the content.

For the identification of a piece of content, the ACR service is utilized in which signature data (for example, a watermark or a fingerprint) extracted periodically from the piece of content being viewed and representative of a characteristic of the piece of content is compared with signature data of pieces of content registered in a database in advance to identify the piece of content.

The ACR service utilization system 10 is configured from a provider system 20 on the side which supplies content and a linked application and so forth corresponding to the content, and a home network system 30 on the user side who views content or utilizes a linked application.

The provider system 20 and the home network system 30 are connected to each other through a broadcasting network 11 and a bidirectional communication network 12. Here, the broadcasting network 11 includes a TV broadcasting network, a CATV network, an IPTV network and so forth. The bidirectional communication network 12 is an IP communication network represented by the Internet.

It is to be noted that lines between the multi-window screen device 40-2 belonging to the home network system 30 and the provider system 20 through the broadcasting network 11 and the bidirectional communication network 12 are omitted.

[Description of Provider System 20]

The provider system 20 is configured from a content server 21, a metadata server 22, an application server 23 and an ACR server 24.

The content server 21 broadcasts content such as a program or a CM through the broadcasting network 11. Further, the content server 21 supplies content to be broadcast to the ACR server 24. It is to be noted that, in place of supplying content, a content identifier and signature data extracted in advance from the content may be supplied to the ACR server 24.

The metadata server 22 supplies metadata corresponding to content broadcast from the content server 21 to the ACR server 24. The metadata includes various kinds of information relating to the content, an identifier representative of a linked application to be executed in accordance with the progression of the content, data to be used in the linked application and so forth.

The application server 23 supplies an application and data to be utilized in the application through the bidirectional communication network 12 in accordance with a request from the second screen device 50 of the home network system 30.

The ACR server 24 generates in advance ACR reference data in which a content identifier, an application identifier and so forth are coordinated with signature data extracted in a predetermined sampling period from various pieces of content which can be viewed on the multi-window screen device 40 of the home network system 30 to form a database and retains the database. The ACR server 24 generates an ACR response in response to an ACR query transmitted from any of ACR clients 42A to 42C of the multi-window screen device 40 based on the database of the ACR reference data, and transmits the ACR response.

It is to be noted that the content server 21, metadata server 22, application server 23 and ACR server 24 which configure the provider system 20 may be disposed in a concentrated manner at one place or may be disposed separately in a decentralized fashion. Or some of the components may be combined suitably. Further, a plural number of servers may be provided for each of the component servers.

[Description of Home Network System 30]

The home network system 30 is configured from the multi-window screen device 40 such as a TV receiver having a large-sized screen, and the second screen device 50 such as a tablet type terminal, a slate PC or a smartphone. The multi-window screen device 40 and the second screen device 50 are connected to each other, for example, by a wireless LAN.

It is to be noted that a plurality of such multi-window screen devices 40 and a plurality of such second screen devices 50 may be provided in the home network system 30.

The multi-window screen device 40 provides a plurality of windows on the screen thereof and displays different pieces of content simultaneously in the windows so as to be viewed by the user. The multi-window screen device 40 includes a content renderer 41, an ACR client 42, a UPnP (Universal Plug and Play) server 43, a local Web server 44, and a window manager 45. A number of such content renderers 41 and a number of such ACR clients 42 equal to the number of windows which can be set by the multi-window screen device 40 are incorporated.

In the present embodiment, it is assumed that the multi-window screen device 40 can provide three windows A, B and C on the screen thereof. In this instance, it is assumed that three content renders 41A, 41B and 41C and three ACR clients 42A, 42B and 42C are incorporated correspondingly. The number of windows which can be set is not limited to three. In the following description, where there is no necessity to individually distinguish the content renders 41A, 41B and 41C from one another, each of them is referred to simply as content renderer 41. This similarly applies also to the ACR clients 42A, 42B and 42C.

The content renderer 41A acquires and branches all pieces of content to be displayed in the window A on the screen of the multi-window screen device 40 and supplies the pieces of content to the ACR client 42A. In particular, the content renderer 41A acquires and branches not only content broadcast from the content server 21 but also content inputted through various input terminals (HDMI terminal and so forth) of the multi-window screen device 40 and supplies the acquired content to the ACR client 42A. This similarly applies also to the content renderers 41B and 41C.

The ACR client 42A extracts, from content inputted thereto from the content renderer 41A, signature data representative of a characteristic of the content in a predetermined sampling period. Here, as the extraction method of signature data, an extraction method same as that used by the ACR server 24 of the provider system 20 (hereinafter described) is used.

Further, the ACR client 42A generates an ACR query including the extracted signature data and transmits the ACR query to the ACR server 24 of the provider system 20 through the bidirectional communication network 12. Further, the ACR client 42A receives and retains an ACR response transmitted thereto from the ACR server 24 in response to the ACR query transmitted therefrom. This similarly applies also to the ACR clients 42B and 42C.

The UPnP server 43 universally notifies an other device (in the present case, the second screen device 50), which configures the home network system 30 together with the multi-window screen device 40, of details of a WebAPI (Web Application Program Interface) adapted to call a function of the multi-window screen device 40 (in the present case, to utilize the ACR service by the ACR client 42) in which the UPnP server 43 itself is incorporated. In particular, the UPnP server 43 newly defines a protocol on a basic protocol provided by a general UPnP server and uses the defined protocol to carry out universal notification (hereinafter described in detail).

The local Web server 44 allows an other device (in the present case, the second screen device 50) which configures the home network system 30 together with the multi-window screen device 40 to utilize a function of the multi-window screen device 40 (in the present case, in the present case, to utilize the ACR service by the ACR client 42) in which the local Web server 44 itself is incorporated. In particular, the local Web server 44 controls the ACR client 42 in response to the fact that the WebAPI let known from the UPnP server 43 is called to utilize the ACR service, and transfers an ACR response transmitted back from the ACR server 24 to the second screen device 50.

The window manager 45 controls display of a frame of the windows provided on the screen of the multi-window screen device 40.

The second screen device 50 presents, in the present embodiment, metadata of content being viewed principally on the multi-window screen device 40 to the user or executes a linked application in accordance with the progression of the content. The second screen device 50 includes a plurality of ACR applications 51, a number of linked application managers 52 equal to the number of ACR applications 51, and a window manager 53.

In the present embodiment, it is assumed that the second screen device 50 includes three ACR applications 51*a*, 51*b* and 51*c* and three linked application managers 52*a*, 52*b* and 52*c*. However, the number of them is not limited to three. In the following description, where there is no necessity to individually distinguish the ACR applications 51*a*, 51*b* and 51*c*, each of them is referred to merely as ACR application 51. This similarly applies also to the linked application managers 52*a*, 52*b* and 52*c*.

The ACR application 51 is installed in advance in the second screen device 50 and is started up when the ACR service is utilized in a linked relationship with the multi-window screen device 40. The ACR application 51 acquires a WebAPI adapted to read out a function which uses the ACR service from the UPnP server 43 and calls the WebAPI to acquire an ACR response from the ACR server 24 received by the ACR client 42 through the local Web server 44. Furthermore, the ACR application 51 analyzes the acquired ACR response and notifies the linked application manager 52 of a result of the analysis.

The linked application manager 52 presents, in accordance with a notification from the ACR application 51, metadata included in the ACR response to the user or acquires and executes a linked application corresponding to the content being viewed on the multi-window screen device 40 from the application server 23 through the bidirectional communication network 12. It is to be noted that a Web browser can be used as the linked application manager 52.

The window manager 53 carries out setting, to the frame which displays information (screen image of metadata or a linked application) displayed by each of the linked application managers 52, same as the setting of the frame visual attribute of the window of the multi-window screen device 40 in which the corresponding content is displayed.

[Example of Detailed Configuration of ACR Server 24]

Figure 4:
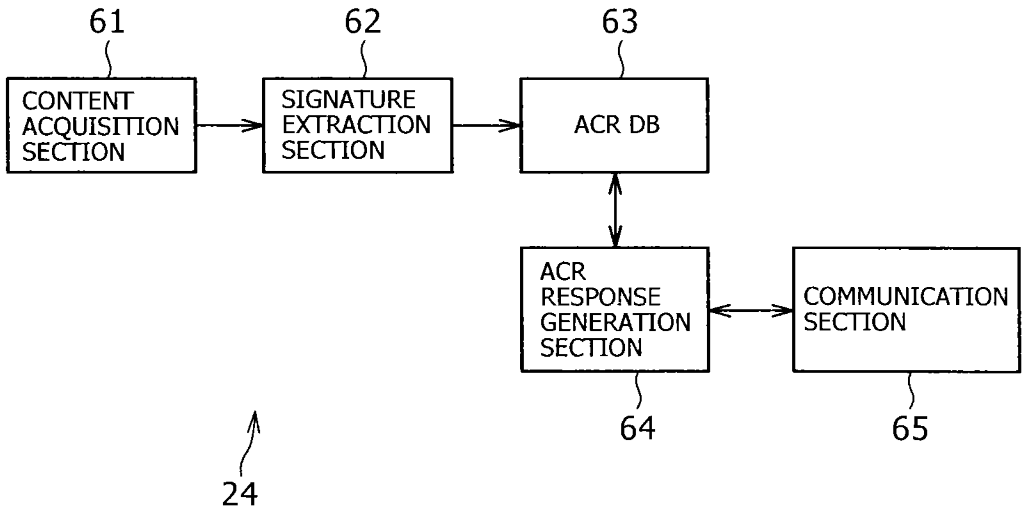
FIG. 4 is a block diagram showing an example of a configuration of an ACR server.

FIG. 4 shows an example of a detailed configuration of the ACR server 24 included in the provider system 20.

The ACR server 24 is configured from a content acquisition section 61, a signature extraction section 62, an ACR database (DB) 63, an ACR response generation section 64, and a communication section 65.

The content acquisition section 61 acquires content, which the content server 21 is scheduled to broadcast through the broadcasting network 11, or various pieces of content, which can be viewed on the multi-window screen device 40, from the content server 21 or the like and supplies the acquired content to the signature extraction section 62. The signature extraction section 62 extracts, from the content supplied thereto from the content acquisition section 61, signature data representative of a characteristic of the content in a predetermined sampling period using a predetermined extraction method and outputs the signature data to the ACR database 63.

To the extraction method of signature data by the signature extraction section 62, an existing arbitrary method can be applied. For example, a watermark embedded in advance in content may be extracted and used as signature data, or a fingerprint may be calculated and used as signature data.

If a fingerprint is used as signature data, then even if the resolution, aspect ratio, bit rate, encoding format or the like of content is converted, the same signature data can be obtained before and after the conversion. Accordingly, the identification accuracy when identification of content is carried out based on the signature data can be enhanced.

It is to be noted that, where a plurality of ACR servers 24 are involved, the same extraction method of signature data by the signature extraction section 62 need not be used by the individual ACR servers 24, but an arbitrary extraction method can be adopted for each of the ACR servers 24.

The ACR database 63 generates and stores ACR reference data in which a content identifier or the like representative of a piece of content of an extraction source from which each signature data is extracted is associated with each signature data inputted from the signature extraction section 62. Consequently, the signature data extracted from the content are converted into a database. The data structure of ACR reference data is hereinafter described with reference to FIG. 4.

The ACR response generation section 64 refers to the ACR database 63 to identify a piece of content of an extraction source of signature data included in an ACR query transmitted thereto from the ACR client 42. Further, the ACR response generation section 64 generates an ACR response which includes the content identifier as a result of the identification, associated metadata and so forth. The data structure of the ACR response is hereinafter described with reference to FIGS. 8A and 8B. The communication section 65 receives an ACR query transmitted thereto from the ACR client 42 and outputs the ACR query to the ACR response generation section 64, and transmits an ACR response generated by the ACR response generation section 64 to the ACR client 42.

[Example of Detailed Configuration of ACR Client 42]

Figure 5:
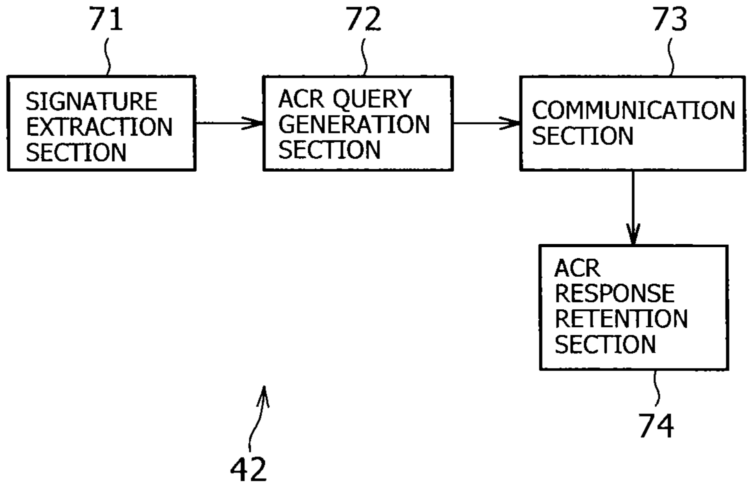
FIG. 5 is a block diagram showing an example of a configuration of an ACR client.

FIG. 5 shows an example of a detailed configuration of the ACR client 42 incorporated in the multi-window screen device 40.

The ACR client 42 is configured from a signature extraction section 71, an ACR query generation section 72, a communication section 73, and an ACR response retention section 74.

The signature extraction section 71 extracts, from content branched and supplied from the content renderer 41, signature data representative of a characteristic of the content in a predetermined sampling period and outputs the signature data to the ACR query generation section 72. It is to be noted that the extraction method of signature data by the signature extraction section 71 is common to that by the signature extraction section 62 of the ACR server 24 to be utilized.

The ACR query generation section 72 generates an ACR query which includes signature data extracted by the signature extraction section 71 and is used to request the ACR server 24 to identify content. The data structure of the ACR query is hereinafter described with reference to FIG. 7.

The communication section 73 transmits an ACR query generated by the ACR query generation section 72 to the ACR server 24, receives an ACR response transmitted thereto from the ACR server 24 and outputs the received ACR response to the ACR response retention section 74. The ACR response retention section 74 retains the ACR response received by the communication section 73. It is to be noted that the retained ACR response is transferred to the second screen device 50 by the local Web server 44.

[Data Structure of ACR Reference Data]

Figure 6:
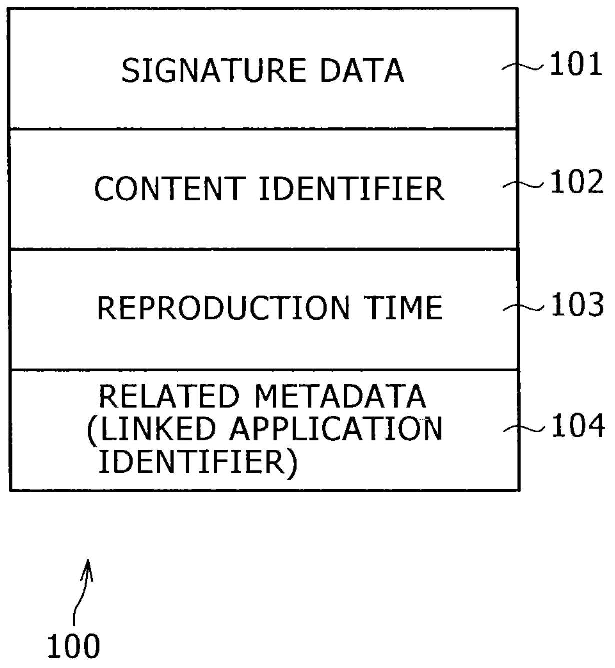
FIG. 6 is a view illustrating a data structure of ACR reference data.

FIG. 6 illustrates a data structure of ACR reference data formed as a database in the ACR database 63 of the ACR server 24.

In ACR reference data 100, a content identifier 102, reproduction time 103 and related metadata 104 are associated with each signature data 101 extracted in a predetermined cycle from content.

The signature data 101 is extracted from content by the signature extraction section 62. The content identifier 102 is information representative of a piece of content of an extraction source of the signature data 101. The reproduction time 103 indicates progression timing of a piece of content represented by the content identifier 102 at a time at which the signature data 101 is extracted from the content, and is represented, for example, by an elapsed period of time from the top of the piece of content.

The related metadata 104 includes metadata of a piece of content represented by the content identifier 102, a linked application identifier (information uniquely representing a linked application to be executed in accordance with the progression timing of a piece of content indicated by the reproduction time 103) and various data to be utilized by the executed linked application.

It is to be noted that the related metadata 104 may have contents which differ depending upon the progression timing of a piece of content indicated by the reproduction time 103.

[Data Structure of ACR Query]

Figure 7:
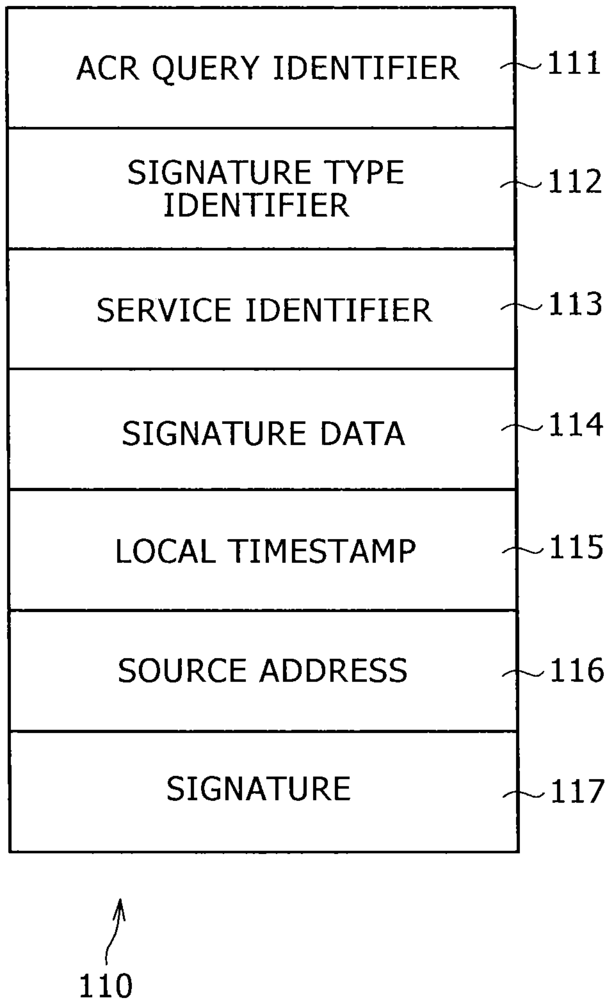
FIG. 7 is a view illustrating a data structure of an ACR query.

FIG. 7 illustrates a data structure of an ACR query generated by the ACR query generation section 72 of the ACR client 42.

An ACR query 110 includes an ACR query identifier 111, a signature type identifier 112, a service identifier 113, signature data 114, a local timestamp 115, a source address 116 and a signature 117.

The ACR query identifier 111 is information used to uniquely specify the ACR query 110. The signature type identifier 112 is information used to specify an extraction method used when the signature data 114 is extracted. The service identifier 113 is information used to select, where a plurality of ACR servers 24 exist, one of the ACR servers 24 to which the ACR query 110 is to be transmitted to obtain an ACR response.

The signature data 114 is extracted from content by the signature extraction section 71 of the ACR client 42. The local timestamp 115 indicates a timing at which the signature data 114 is extracted from the content and is represented by time indicated by a local system clock of the multi-window screen device 40.

The source address 116 is an address of the ACR client 42, which originates the ACR query 110, in the bidirectional communication network 12, and is utilized as information representative of a transmission designation of an ACR response generated by the ACR server 24 in response to the ACR query 110. The signature 117 suppresses falsification of the ACR query 110. It is to be noted that the ACR query 110 may be transmitted after it is encoded fully.

[Data Structure of ACR Response]

Figure 8A:
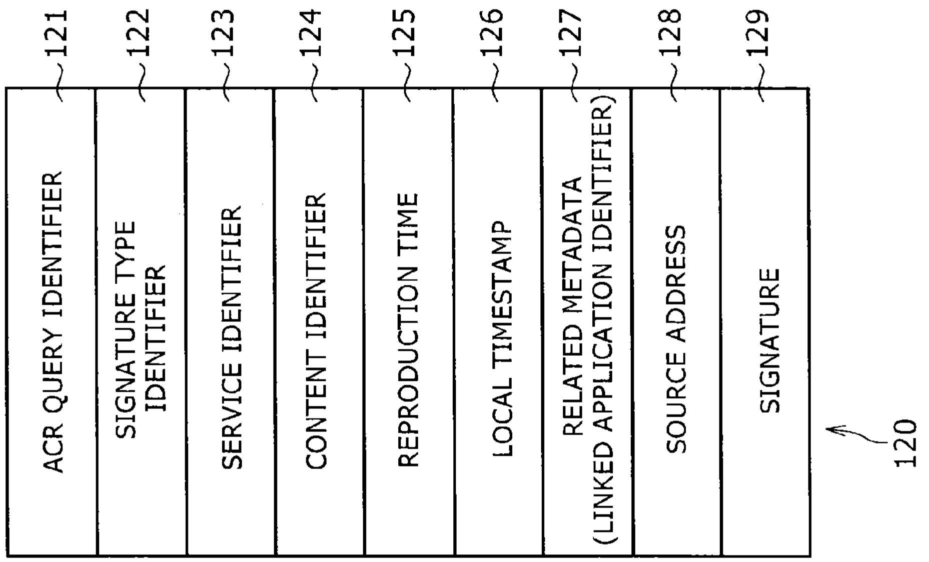
FIGS. 8A and 8B are views each illustrating a data structure of an ACR response.
Figure 8B:
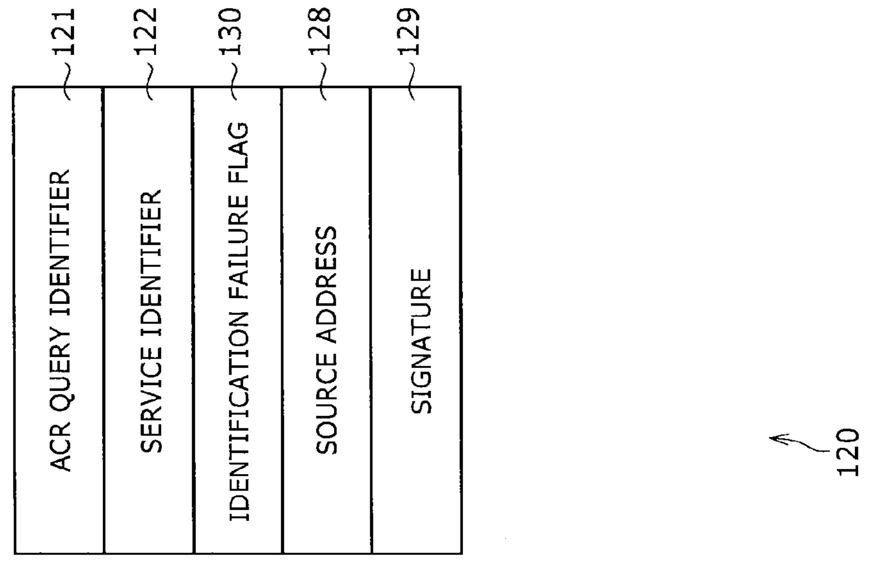

FIGS. 8A and 8B illustrate data structures of an ACR response generated by the ACR response generation section 64.

An ACR response 120 has a data structure illustrated in FIG. 8A or 8B. FIG. 8A illustrates a data structure of the ACR response 120 in the case where a piece of content of an extraction source of the signature data 114 included in the ACR query 110 is identified successfully, namely, in the case where the user of the multi-window screen device 40 successfully identifies the piece of content being viewed. FIG. 8B illustrates a data structure of the ACR response 120 in the case where the piece of content is not identified successfully.

In the ACR response 120 (FIG. 8A) in the case where the user of the multi-window screen device 40 successfully identifies the piece of content being viewed, an ACR query identifier 121, a signature type identifier 122, a service identifier 123, a content identifier 124, a reproduction time 125, a local timestamp 126, related metadata 127, a source address 128 and a signature 129 are included.

Meanwhile, in the ACR response 120 (FIG. 8B) in the case where the user of the multi-window screen device 40 does not successfully identify the piece of content being viewed, the ACR query identifier 121, the service identifier 122, the source address 128, the signature 129 and an identification failure flag 130 are included.

The ACR query identifier 121, signature type identifier 122, service identifier 123 and local timestamp 126 are used to specify the ACR query 110 which requests transmission of the ACR response 120, and the ACR query identifier 111, signature type identifier 112, service identifier 113 and local timestamp 115 of the ACR query 110 are cited and described.

The content identifier 124, reproduction time 125 and related metadata 127 represent a result of identification of content, and the content identifier 102, reproduction time 103 and related metadata 104 of the corresponding ACR reference data 100 are cited and described.

The source address 128 is an address of the ACR server 24, which transmits the ACR response 120, in the bidirectional communication network 12. The signature 129 is used to suppress falsification of the ACR response 120. It is to be noted that the ACR response 120 may be entirely encrypted and transmitted to prevent falsification thereof.

The identification failure flag 130 is a flag representing failure by the ACR server 24 in identification of a piece of content of an extraction source of the signature data 114 included in the ACR query 110 from the ACR client 42, namely, of a piece of content being viewed by the user of the multi-window screen device 40.

[Process of Home Network System 30 of ACR Service Utilization System 10]

Now, two different processes when the second screen device 50 in the home network system 30 acquires a device description which is information relating to functions which can be utilized by the multi-window screen device 40 are described.

It is to be noted that the functions which can be utilized by the multi-window screen device 40 in the present embodiment indicate utilization of the ACR service by the ACR client 42 and application of a frame visual attribute to each window on the screen by the window manager 45.

Figure 9:
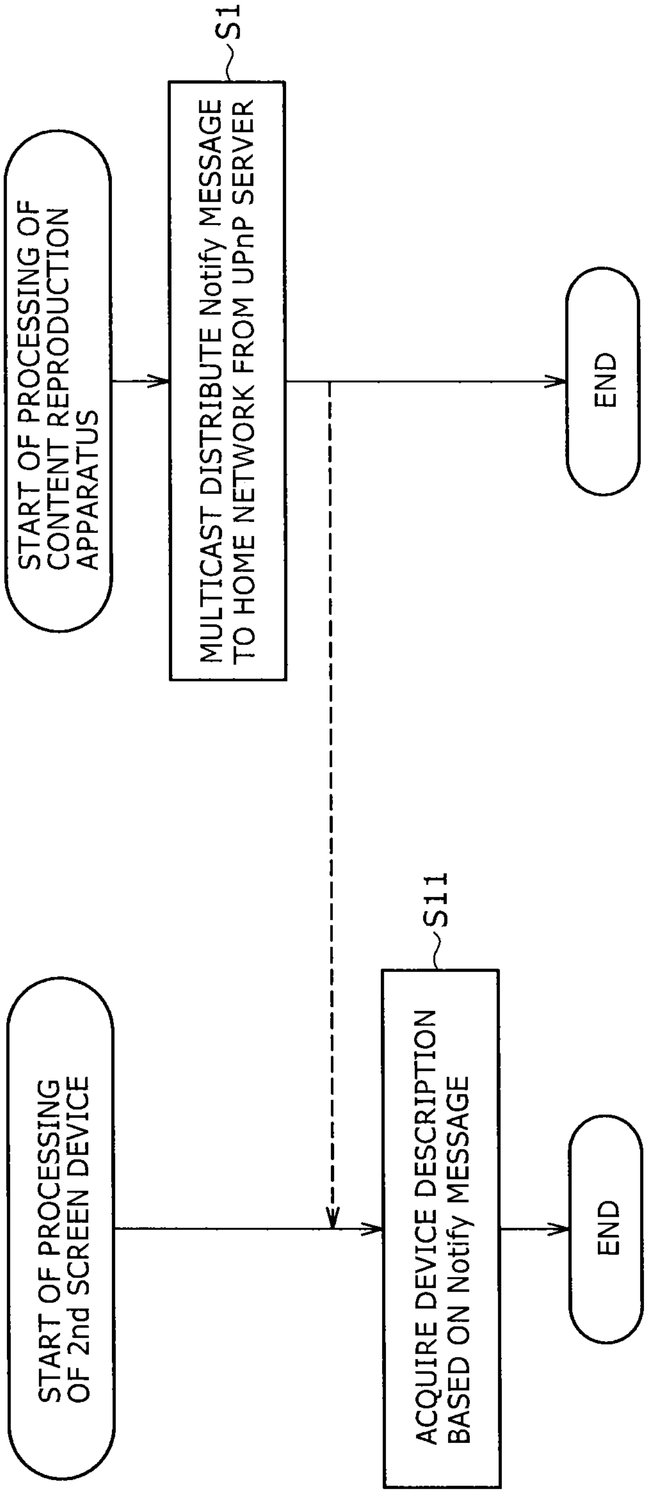
FIG. 9 is a flow chart illustrating a pre-process in a home network system.

FIG. 9 is a flow chart illustrating processing in the case where, in a state in which the ACR application 51 is started up already in the second screen device 50, the multi-window screen device 40 is connected to the network system 30 (including also the timing at which the multi-window screen device 40 is started up).

At step S1, the UPnP server 43 of the multi-window screen device 40 multicast distributes a Notify message defined by the UPnP given below to the home network system 30. The Notify message is transferred to the home network system 30 using a UDP/IP and received, in the present case, by the ACR application 51 of the second screen device 50.

NOTIFY * HTTP/1.1

. . .

LOCATION "http://192.168.0.4:55500"

. . .

In the LOCATION header of the Notify message, an acquisition destination address of a device description of the multi-window screen device 40 is described. Therefore, at step S11, the ACR application 51 of the second screen device 50 acquires the device description from the acquisition destination address using a HTTP GET.

By the process described above, the ACR application 51 of the second screen device 50 can acquire the device description of the multi-window screen device 40.

Figure 10:
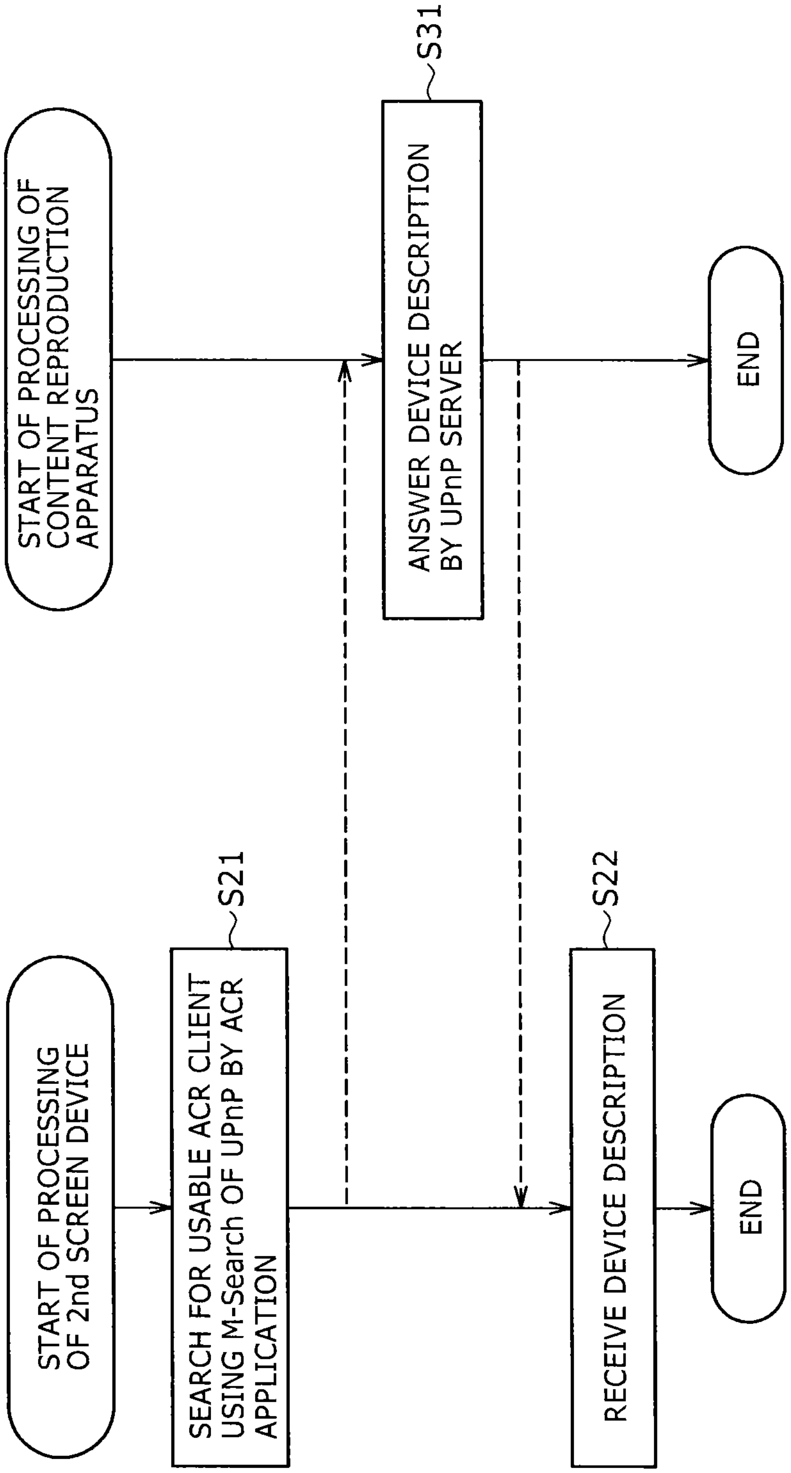
FIG. 10 is a flow chart illustrating another pre-process in the home network system.

FIG. 10 is a flow chart illustrating a process when the ACR application 51 is started up in the second screen device 50 later in a state in which the multi-window screen device 40 has already been connected to the network system 30 and started up.

In this instance, since multicast distribution of the Notify message by the UPnP server 43 of the multi-window screen device 40 has been carried out already, the ACR application 51 of the second screen device 50 cannot receive the Notify message. Therefore, at step S21, the ACR application 51 searches ACR clients which can be utilized by an M-Search defined by the UPnP.

The UPnP server 43 of the multi-window screen device 40 responding to the M-Search answers the device description at step S31. The ACR application 51 receives the device description at step S22.

By the process described above, the ACR application 51 of the second screen device 50 can acquire the device description of the multi-window screen device 40.

[Example of Device Description]

Here, an example of the device description is described. In order to describe a device description, for example, an XML file is used.

A first example of the device description is described below.

First example of the device description

```
<root xmlns="urn:schemas-upnp-org:device-1-0">
...
<serviceList>
        <service>
            <serviceType>" urn:abc:service:ACRClient.v1" </servic
eType> (signifies ACR client service)
            <serviceId>" urn:UPnP:serviceId:1234"</serviceId> (si
gnifies service ID of ACR client service)
            <SCPDURL></SCPDURL>
            <controlURL>" http://192.168.0.4:55500/getACRRespons
e"</controlURL>
            <WindowStyle>"http://192.168.0.4:55500/windowStyle"<
/WindowStyle>
        ...
        </service>
    </serviceList>
...
</root>
```

It is to be noted that, in a <SCPDURL> element of a device description prescribed in an existing general UPnP, an acquisition destination address of a service description described in regard to ACR services which can be utilized by the ACR client 42 is described, and the ACR application 51 acquires the service description from the acquisition destination address using the HTTP GET. Further, the ACR application 51 sends a message of an action to a URL described in a <controlURL> element using a SOAP prescribed in the UPnP to call the action (in the present case, transmission of an ACR query and transfer of an ACR response).

However, in the present embodiment, in order to make it possible to call an action by a reduced number of steps, such a device description prescribed in the UPnP as described above is expanded such that the WebAPI adapted to call the action is described directly in the device description.

In particular, as in the case of the first example described hereinabove, for example, the <SCPDURL> element is left empty with nothing described therein, or else a predetermined dummy character string is described in the <SCPDURL> element while a server side script URL (in the case of the first example, http://192.168.0.4:55500/getACRResponse) of the WebAPI adapted to start up the ACR client and request transfer of the ACR response 120 is described directly in the <controlURL> element.

Further, a <WindowStyle> element which is not described in the UPnP is provided newly such that a server side script URL (in the case of the first example, http://192.168.0.4:55500/widowStyle) of the WebAPI adapted to notify the window manager 45 of a frame visual attribute or change the frame visual attribute is described directly in the <WindowStyle> element.

It is to be noted that a <service> element is described for each of the installed ACR clients 42. Accordingly, in the case of the present embodiment, three <service> elements are described in a <serviceList>.

Or, a <WebAPIURL> element which is not prescribed by the UPnP may be provided newly such that a server side script URL of the WebAPI is described directly in the <WebAPIURL> element as in the case of a second example described below.

Second example of the device description

```
<root xmlns="urn:schemas-upnp-org:device-1-0">
...
<serviceList>
        <service>
```

-continued

<serviceType>" urn:abc:service:ACRClient.v1" </serviceType> (signifies ACR client service)
<serviceId>" urn:UPnP:serviceId:1234" </serviceId> (signifies service ID of ACR client service)
<SCPDURL></SCPDURL>
<controlURL></controlURL>
<WebAPIURL>"
http://192.168.0.4:55500/getACRResponse"
</WebAPIURL>
<WindowStyle>"http://192.168.0.4:55500/windowStyle"</WindowStyle>
...
</service>
</serviceList>

The ACR application 51 of the second screen device 50 which has acquired the device description of the first or second example can cause an action to be executed by calling the getACRResponse which is the server side script url of the WebAPI described in the <controlURL> element or the <WebAPIURL> element of the device description using the HTTP GET.

In particular, it is possible to start up, if the ACR client 42 of the multi-window screen device 40 is not started up as yet, the ACR client 42, cause the ACR client 42 to transmit the ACR query 110, and transfer the ACR response 120 sent back in response to the ACR query 110. It is to be noted that the transfer of the ACR response 120 is carried out in a state in which it is described in the body of an HTTP response returned in response to the WebAPI, for example, in the following manner using a JSON.

HTTP/1.1 200 OK
Content-Type: application/json; charset=utf-8
. . .
"Contents of ACR response encoded by JSON"

A transaction which uses the WebAPI is carried out by repetitive polling while content is being viewed. Then, in response to the progression of the content, the related metadata 127 and so forth in the ACR response 120 converted currently are presented to the user through the second screen device 50.

If the device description is expanded and standardized as described above, then the multi-window screen device 40 and the second screen device 50 which are fabricated and sold by different vendors can rapidly operate in a linked relationship with each other.

It is to be noted that, a WebSocket whose standardization is formulated by the IETF (Internet Engineering Task Force) and so forth may be used in place of use of the WebAPI. Where the WebSocket is used, a WebSocket server is provided in the local Web server 44 (or the ACR client 42 or second screen device 50) such that a session (TCP connection) establishment request is issued from both of the ACR application 51 and the ACR client 42 through the WebSocket server to establish a session and the ACR response 120 is transferred on the session using the JSON described hereinabove or the like.

In this instance, if the ACR client 42 receives a new ACR response 120 from the ACR server 24, then the ACR response 120 is transferred immediately to the ACR application 51 through the established session. Accordingly, the necessity for polling which is necessitated where the WebAPI is used is eliminated, and immediate transfer of the ACR response 120 which does not rely upon the period of polling becomes possible.

Further, the ACR application 51 can acquire a frame visual attribute of a window provided on the screen of the multi-window screen device 40 from the window manager 45 through the local Web server 44 by calling a windowStyle, which is the server side script url of the WebAPI described in the <WindowStyle> element of the device description by the HTTP GET.

In particular, a frame visual attribute is described in the body of an HTTP response returned in response to the WebAIP. For example, if a color is set as a frame visual attribute, then border-color:#ffa000->example of designating an orange border color is described in the body of the HTTP response.

It is to be noted that, if the frame visual attribute returned from the multi-window screen device 40-1 and the frame visual attribute returned from the multi-window screen device 40-2 overlap with each other, then it is possible to request one of the multi-window screen devices 40-1 and 40-2 to change the frame visual attribute.

In particular, a frame visual attribute into which the frame visual attribute is to be changed may be described into the body of a request by a HTTP POST request to the URL of the WebAPI of the <WindowStyle> element. The following example indicates a case in which an overlapping frame visual attribute is changed to (border-color:#ffa001).

POST /windowStyle HTTP/1.0
host: 192.168.0.4:55500
Content-Length: 20
border-color:#ffa001

[Operation by ACR Service Utilization System 10]

Now, operation of the ACR service utilization system 10 is described.

It is to be noted that, as a prerequisite of operation described below, it is assumed that, in the home network system 30, the ACR application 51 of the second screen device 50 has already acquired a device description from the UPnP server 43 of the multi-window screen device 40.

Further, it is assumed that, in the ACR server 24 of the provider system 20, ACR reference data 100 corresponding to various pieces of content which can be viewed on the multi-window screen device 40 have been generated and are registered in the ACR database 63.

Figure 11:
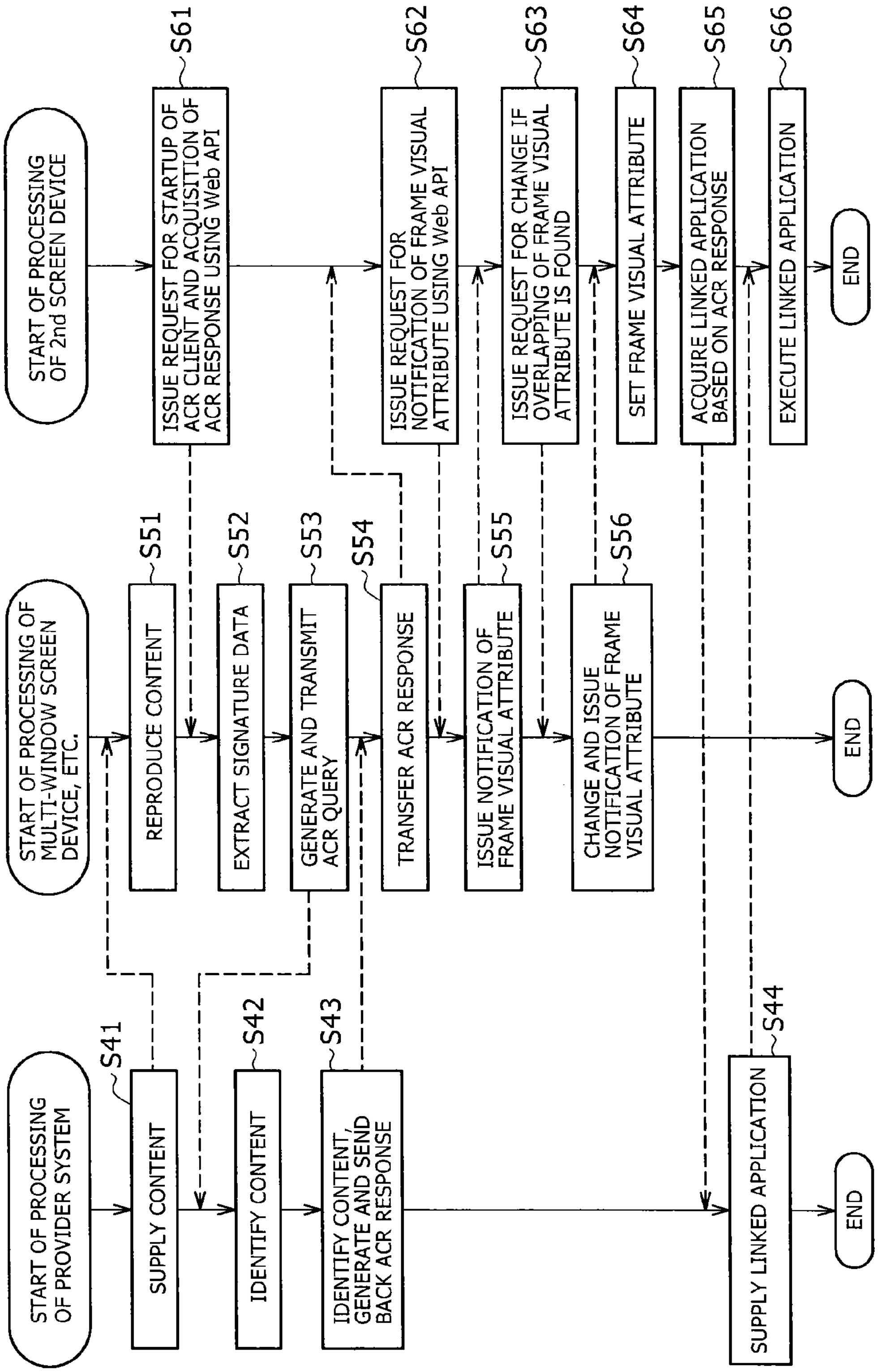
FIG. 11 is a flow chart illustrating operations of the ACR service utilization system.

FIG. 11 is a flow chart illustrating operation of the ACR service utilization system 10.

At step S41, the content server 21 of the provider system 20 starts transmission of content through the broadcasting network 11.

On the other hand, in the home network system 30, the multi-window screen device 40 starts reception and reproduction of the content at step S51. Here, if the ACR application 51 of the second screen device 50 calls the WebAPI which requests startup of the ACR client 42 and transfer of an ACR response at step S61, then the ACR client 42 and so forth start operation under the control of the local Web server 44 in response to the WebAPI.

In particular, if the ACR client 42 of the multi-window screen device 40 receives supply of a piece of content which is being viewed from the content renderer 41, then the signature extraction section 71 extracts the signature data 114 from the piece of content and outputs the signature data 114 to the ACR query generation section 72 at step S52. At step S53, the ACR query generation section 72 generates an ACR query 110 which includes the signature data 114, and the communication section 73 transmits the generated ACR query 110 to the ACR server 24.

In the ACR server 24 which receives the ACR query 110 from the ACR client 42, the ACR response generation section 64 refers to the ACR database 63 to identify a piece of content corresponding to the signature data 114 included in the received ACR query 110 at step S42. Further, the ACR response generation section 64 generates an ACR response 120 in response to a result of the identification of the piece of content and the communication section 65 transmits the generated ACR response 120 to the ACR client 42 at step S43.

The ACR client 42 which receives the ACR response 120 from the ACR server 24 supplies the received ACR response 120 to the local Web server 44 at step S54. The local Web server 44 transfers the ACR response 120 to the ACR application 51 of the second screen device 50.

In the ACR application 51 which receives the ACR response 120 transferred thereto, the ACR application 51 of the second screen device 50 calls the WebAPI used to request notification of a frame visual attribute at step S62. In response to this, the local Web server 44 notifies the ACR application 51 of the frame visual attribute managed by the window manager 45 at step S55.

The ACR application 51 which receives the notification of the frame visual attribute notifies the window manager 53 of the frame visual attribute. The window manager 53 confirms whether or not the received frame visual attribute overlaps with the frame visual attribute notified already from an other multi-window screen device 40. If an overlapping is detected, then the ACR application 51 requests change of the frame visual attribute by an HTTP POST request. The request is transmitted from the local Web server 44 to the window manager 45 at step S56. If the window manager 45 changes the frame visual attribute in accordance with the request, then the frame visual attribute after the change is conveyed as a notification from the local Web server 44 to the ACR application 51. The ACR application 51 which receives the frame visual attribute after the change notifies the window manager 53 of the frame visual attribute after the change at step S64. The window manager 53 sets the frame visual attribute of a screen image of a linked application to be displayed thereafter and the like based on the frame visual attribute after the change.

It is to be noted that, if it is confirmed at step S62 that the frame visual attribute does not overlap, then a change of the frame visual attribute is not requested, and the process at step S64 is executed.

Further, the processes at steps S62 to S64 may be executed immediately after the process at step S61 without waiting for the process at step S54 (transfer of an ACR response).

At step S65, the ACR application 51 analyzes the related metadata 127 included in the ACR response 120 transferred thereto and causes the linked application manager 52 to acquire a linked application to be executed in conformity with the progression of the piece of content being viewed.

At step S66, the linked application manager 52 acquires and executes the linked application supplied by the process at step S44 by the application server 23. It is to be noted that, if the linked application has been acquired already, then the acquisition can be omitted. Further, if the linked application has already been started up, then the startup of the linked application can be omitted. Furthermore, information included in the related metadata 127 is sometimes presented to the user without involving execution of the linked application.

At this time, the frame of the screen image of the linked application presented to the user has the frame visual attribute coinciding with the frame visual attribute of the frame of the window in which the corresponding piece of content is displayed on the multi-window screen device 40.

The processes at steps S41 to S44, processes at steps S51 to S56 and processes at steps S61 to 66 described above are executed repetitively while the content is viewed. However, it is possible to omit the repetitions or reduce the frequency in execution of the processes at steps S61 to S66 and the processes at steps S55 and S56.

Consequently, the second screen device 50 can operate the linked application in accordance with the progression of a piece of content being viewed on the multi-window screen device 40 by the user.

Further, the user can quickly grasp to which one of pieces of content displayed on the multi-window screen device 40 the screen image presented to the user by the second screen device 50 corresponds.

Incidentally, while it is possible to configure the servers from the content server 21 to ACR server 24 of the provider system 20 and the multi-window screen device 40 and second screen device 50 of the home network system 30, which execute the series of processes described above individually by hardware, they may otherwise be implemented by a computer executing software. This computer includes a computer incorporated in hardware for exclusive use, a personal computer, for example, for universal use which can execute various functions by installing various programs, and so forth.

Figure 12:
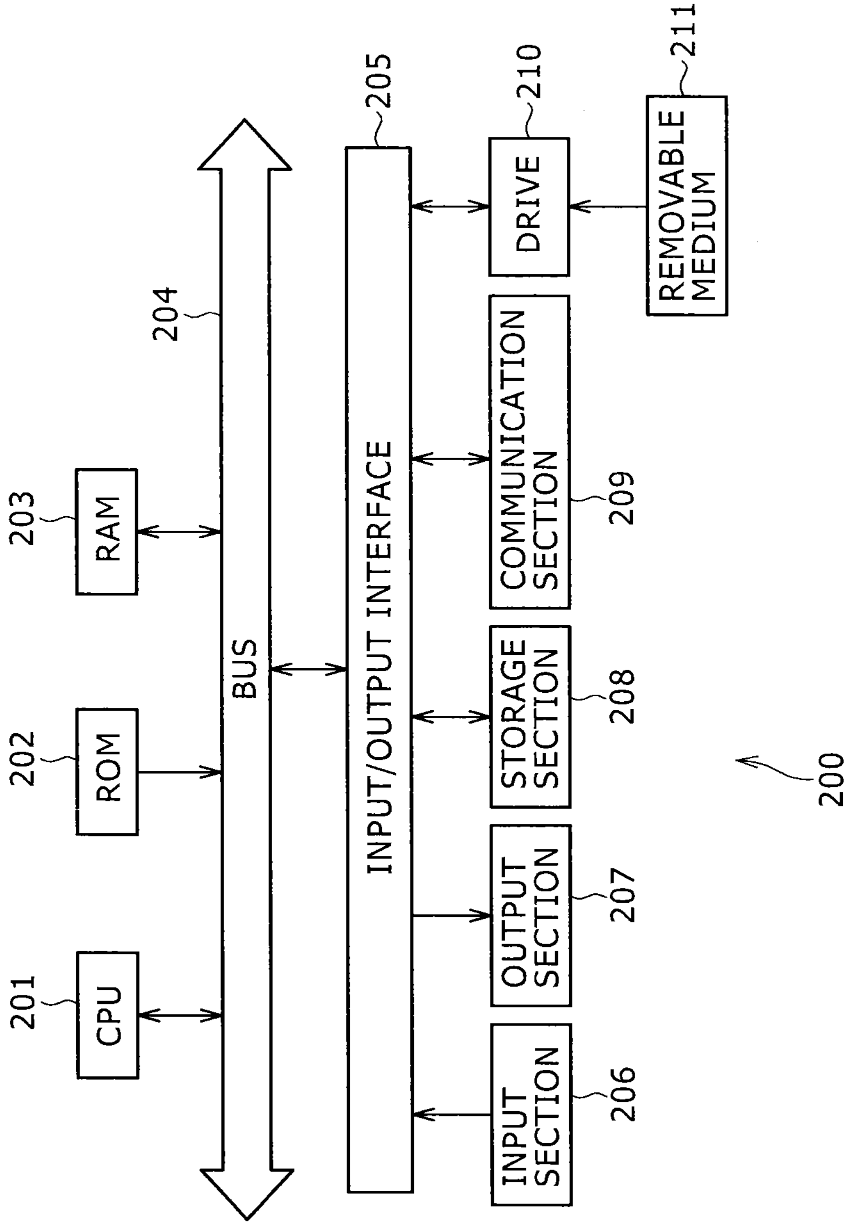
FIG. 12 is a block diagram showing an example of a configuration of a computer.

FIG. 12 is a block diagram showing an example of a hardware configuration of the computer described above.

In a computer 200, a CPU (Central Processing Unit) 201, a ROM (Read Only Memory) 202 and a RAM (Random Access Memory) 203 are connected to one another by a bus 204.

Further, an input/output interface 205 is connected to the bus 204. An inputting section 206, an outputting section 207, a storage section 208, a communication section 209 and a drive 220 are connected to the input/output interface 205.

The inputting section 206 is configured from a keyboard, a mouse, a microphone and so forth. The outputting section 207 is configured from a display unit, a speaker and so forth. The storage section 208 is configured from a hard disk, a nonvolatile memory or the like. The communication section 209 is configured from a network interface and so forth. The drive 220 drives a removable medium 211 such as a magnetic disk, an optical disk, a magneto-optical disk, a semiconductor memory.

In the computer 200 configured in such a manner as described above, the CPU 201 loads a program stored, for example, in the storage section 208 into the RAM 203 through the input/output interface 205 and the bus 204 and executes the program to carry out the series of processes described above.

The program to be executed by the computer 200 (CPU 201) can be recorded on and provided as the removable medium 211 as a package medium, for example. Further, the program can be provided through a wire or wireless transmission medium such as a local area network, the Internet or a digital satellite broadcast.

In the computer 200, the program can be installed into the storage section 208 through the input/output interface 205 by loading the removable medium 211 into the drive 220. Further, the program can be received by the communication section 209 through a wire or wireless transmission medium and installed into the storage section 208. Otherwise, the program can be installed in advance in the ROM 202 or the storage section 208.

It is to be noted that the program to be executed by the computer 200 may be a program by which the processes are carried out in a time series in the order as described in the present specification or a program by which the processes are executed in parallel or at necessary timings such as when the processes are called.

It is to be noted that the embodiment of the present disclosure is not limited to the specific embodiment described hereinabove but can be changed in various manners without departing from the subject matter of the present disclosure.

What is claimed is:

1. An information processing apparatus which cooperates with a terminal apparatus to configure a home network system, comprising:

circuitry configured to set a frame visual attribute to a window provided on a screen to display a reproduced piece of content;

notify the terminal apparatus of a command adapted to request notification of the frame visual attribute set to the window from the information processing apparatus; and notify the terminal apparatus of the frame visual attribute of the window in response to calling of the command by the terminal apparatus.

2. The information processing apparatus according to claim 1, wherein the circuitry is configured to set, to a plurality of windows provided on the screen to display a plurality of different pieces of content therein, different frame visual attributes, and notify the terminal apparatus of a command adapted to request notification of the frame visual attributes of the plurality of windows from the information processing apparatus.

3. The information processing apparatus according to claim 2, wherein the circuitry is configured to change the frame visual attributes of the windows in response to a request issued from the terminal apparatus utilizing the command.

4. The information processing apparatus according to claim 2, wherein the circuitry is configured to include a URL of the command directly in the device description prescribed in UPnP to notify the terminal apparatus of the URL of the command.

5. The information processing apparatus according to claim 2, wherein the command is for a WebAPI.

6. The information processing apparatus according to claim 2, wherein the circuitry is configured to multicast a Notify message on the home network and notify the terminal apparatus of the device description in response to an access from the terminal apparatus based on the Notify message.

7. The information processing apparatus according to claim 2, wherein the circuitry is configured to notify the terminal apparatus of the device description in response to an M-Search from the terminal apparatus.

8. The information processing apparatus according to claim 2, further comprising an identification request processing section, implemented by the circuitry, configured to extract, from a reproduced piece of content, signature data representative of a characteristic of the piece of content, generate and transmit a query including at least the extracted signature data to an identification server and receive a response transmitted thereto from the identification server in response to the query and representative of a result of the identification of the reproduced piece of content, wherein the circuitry is configured to notify the terminal apparatus of a command adapted to render the identification request processing section operative.

9. An information processing method for an information processing apparatus which cooperates with a terminal apparatus to configure a home network system, the method executed by the information processing apparatus, comprising:

a frame visual attribute setting step of setting a frame visual attribute to a window provided on a screen to display a reproduced piece of content;

a notification step of notifying the terminal apparatus of a command adapted to request notification of the frame visual attribute set to the window from the information processing apparatus; and a notification step of notifying the terminal apparatus of the frame visual attribute of the window in response to calling of the command by the terminal apparatus.

10. A non-transitory computer-readable storage medium storing a program used to cause a computer, which cooperates with a terminal apparatus to configure a home network system, to:

set a frame visual attribute to a window provided on a screen to display a reproduced piece of content;

notify the terminal apparatus of a command adapted to request notification of the frame visual attribute set to the window from the information processing apparatus; and notify the terminal apparatus of the frame visual attribute of the window in response to calling of the command by the terminal apparatus.

11. An information processing apparatus which cooperates with a content displaying apparatus, which is configured to display a piece of content in a window provided on a screen, to configure a home network system, the information processing apparatus comprising:

circuitry configured to acquire a command adapted to request notification of a frame visual attribute set to the window provided on the screen of the content displaying apparatus to display a reproduced piece of content from the content displaying apparatus;

call the command to receive notification of the frame visual attribute;

acquire and execute a linked application to be executed in accordance with the progression of the piece of content displayed in the window provided on the screen of the content displaying apparatus; and set a frame visual attribute same as the notified frame visual attribute to a frame in which an image by the linked application is to be displayed.

12. The information processing apparatus according to claim 11, wherein the circuitry is configured to acquire a URL of the command described directly in a device description notified by the content displaying apparatus and prescribed in UPnP.

13. The information processing apparatus according to claim 11, wherein the command is for a WebAPI.

14. The information processing apparatus according to claim 11, wherein the circuitry is configured to acquire the device description from the content displaying apparatus based on a Notify message multicast on the home network by the content displaying apparatus.

15. The information processing apparatus according to claim 11, wherein the circuitry is configured to acquire the device description supplied thereto from the content displaying apparatus searched out by an M-Search.

16. The information processing apparatus according to claim 11, wherein the content displaying apparatus includes an identification request processing section. implemented by circuitry, configured to extract, from a reproduced piece of content, signature data representative of a characteristic of the piece of content, generate and transmit a query including at least the extracted signature data to an identification server and receive a response transmitted back from the identification server in response to the query and representative of a result of the identification of the reproduced piece of content, and the circuitry of the information processing apparatus is configured to acquire a command adapted to render the identification request processing section of the content displaying apparatus operative from the content displaying apparatus, receive the response transferred thereto from the content displaying apparatus by calling the command, and acquire and execute the linked application based on related metadata included in the received response and corresponding to the identified piece of content.

17. An information processing method for an information processing apparatus which cooperates with a content displaying apparatus, displaying a piece of content in a window provided on a screen, to configure a home network system, the method executed by the information processing apparatus, comprising:

an acquisition step of acquiring a command adapted to request notification of a frame visual attribute set to the window provided on the screen of the content displaying apparatus to display a reproduced piece of content from the content displaying apparatus;

a reception step of calling the command to receive the notification of the frame visual attribute;

a linked application execution step of acquiring and executing a linked application to be executed in accordance with the progression of the piece of content displayed in the window provided on the screen of the content displaying apparatus; and a frame displaying controlling step of setting a frame visual attribute same as the notified frame visual attribute to a frame in which an image by the linked application is to be displayed.

18. A non-transitory computer-readable storage medium storing a program used to cause a computer, which cooperates with a content displaying apparatus, which is configured to display a piece of content in a window provided on a screen, to configure a home network system, to:

acquire a command adapted to request notification of a frame visual attribute set to the window provided on the screen of the content displaying apparatus to display a reproduced piece of content from the content displaying apparatus;

call the command to receive notification of the frame visual attribute;

acquire and execute a linked application to be executed in accordance with the progression of the piece of content displayed in the window provided on the screen of the content displaying apparatus; and set a frame visual attribute same as the notified frame visual attribute to a frame in which an image by the linked application is to be displayed.

19. An information processing method for a home network system which includes a content displaying apparatus and a terminal apparatus, comprising:

a frame visual attribute setting step by the content displaying apparatus of setting a frame visual attribute to a window provided on a screen to display a reproduced piece of content;

a notification step by the content displaying apparatus of notifying the terminal apparatus of a command adapted to request notification of the frame visual attribute set to the window from the content displaying apparatus;

an acquisition step by the terminal apparatus of acquiring the notified command;

a notification step by the content displaying apparatus of notifying the terminal apparatus of the frame visual attribute of the window in response to calling of the command by the terminal apparatus;

a linked application execution step by the terminal apparatus of acquiring and executing a linked application to be executed in accordance with the progression of the piece of content displayed in the window provided on the screen of the content displaying apparatus; and a frame displaying controlling step by the terminal apparatus of setting a frame visual attribute same as the notified frame visual attribute to a frame in which an image by the linked application is to be displayed.

* * * * *